United States Patent
Breed et al.

(10) Patent No.: US 10,678,958 B2
(45) Date of Patent: Jun. 9, 2020

(54) INTRUSION-PROTECTED MEMORY COMPONENT

(71) Applicant: Intelligent Technologies International, Inc., Miami Beach, FL (US)

(72) Inventors: David S Breed, Miami Beach, FL (US); Wendell C Johnson, San Pedro, CA (US); Wilbur E DuVall, Katy, TX (US)

(73) Assignee: Intelligent Technologies International, Inc., Miami Beach, FL (US)

( * ) Notice: Subject to any disclaimer, the term of this patent is extended or adjusted under 35 U.S.C. 154(b) by 142 days.

(21) Appl. No.: 15/793,313

(22) Filed: Oct. 25, 2017

(65) Prior Publication Data

US 2018/0060613 A1  Mar. 1, 2018

Related U.S. Application Data

(63) Continuation-in-part of application No. 15/390,535, filed on Dec. 25, 2016, now abandoned.
(Continued)

(51) Int. Cl.
*G06F 21/87* (2013.01)
*H05K 1/02* (2006.01)
(Continued)

(52) U.S. Cl.
CPC .............. *G06F 21/87* (2013.01); *G06F 21/78* (2013.01); *G06F 21/88* (2013.01); *H01L 23/573* (2013.01);
(Continued)

(58) Field of Classification Search
None
See application file for complete search history.

(56) References Cited

U.S. PATENT DOCUMENTS

| 3,609,739 A | 9/1971 | Walter |
| 4,593,384 A | 6/1986 | Kleijne |

(Continued)

FOREIGN PATENT DOCUMENTS

| EP | 0128672 | 12/1984 |
| EP | 1175749 B1 | 7/2005 |

(Continued)

OTHER PUBLICATIONS

Search report for International Application No. PCT/US2018/056869 dated Feb. 10, 2019.
(Continued)

*Primary Examiner* — Fatoumata Traore
(74) *Attorney, Agent, or Firm* — Brian Roffe

(57) ABSTRACT

Intrusion-protected memory-containing assembly including a substrate, a data storage component and processor on the substrate, and a chassis intrusion detector assembly around the substrate. The chassis intrusion detector assembly includes a first plastic film, a mesh including conductor wires arranged on the first plastic film, and a second plastic film covering the mesh. The conductor wires are connected together in a single circuit with the processor to form a single transmission line. The second plastic film has sealed edges integrated with the mesh such that the edges are inseparable without breaking one of the conductor wires of the mesh. The processor takes action to prevent access to data in the data storage component upon detecting a variance in current through or impedance of the transmission line defined by the conductor wires caused by breaking of one of the conductor wires, e.g., causes the data storage component to self-destruct.

20 Claims, 11 Drawing Sheets

Related U.S. Application Data

(60) Provisional application No. 62/271,531, filed on Dec. 28, 2015.

(51) Int. Cl.

| | | |
|---|---|---|
| *H01L 23/00* | | (2006.01) |
| *G06F 21/88* | | (2013.01) |
| *G06F 21/78* | | (2013.01) |
| *H01L 23/31* | | (2006.01) |

(52) U.S. Cl.
CPC ......... *H05K 1/0274* (2013.01); *H05K 1/0275* (2013.01); *H01L 23/3128* (2013.01); *H05K 2201/0323* (2013.01)

(56) References Cited

U.S. PATENT DOCUMENTS

| | | | |
|---|---|---|---|
| 4,811,288 A * | 3/1989 | Kleijne | G06F 21/71 |
| | | | 340/652 |
| 5,027,397 A * | 6/1991 | Double | G06F 21/87 |
| | | | 713/194 |
| 5,159,629 A | 10/1992 | Double et al. | |
| 5,291,243 A | 3/1994 | Heckman et al. | |
| 5,629,984 A | 5/1997 | McManis | |
| 6,023,372 A | 2/2000 | Spitzer et al. | |
| 6,191,503 B1 * | 2/2001 | Kitten | G06F 21/82 |
| | | | 307/112 |
| 6,320,610 B1 | 11/2001 | Van Sant et al. | |
| 6,529,209 B1 | 3/2003 | Dunn et al. | |
| 6,532,298 B1 | 3/2003 | Cambier et al. | |
| 6,646,565 B1 | 11/2003 | Fu et al. | |
| 6,665,428 B1 | 12/2003 | Gozzini | |
| 6,853,293 B2 | 2/2005 | Swartz et al. | |
| 6,917,299 B2 | 7/2005 | Fu et al. | |
| 6,957,345 B2 | 10/2005 | Cesana et al. | |
| 7,054,162 B2 | 5/2006 | Benson et al. | |
| 7,065,656 B2 | 6/2006 | Schwenck et al. | |
| 7,278,734 B2 | 10/2007 | Jannard et al. | |
| 7,551,098 B1 | 6/2009 | Chock et al. | |
| 7,615,416 B1 | 11/2009 | Chock et al. | |
| 7,758,911 B2 | 7/2010 | Heffner | |
| 7,787,256 B2 | 8/2010 | Chan et al. | |
| 7,791,809 B2 | 9/2010 | Filipovich et al. | |
| 7,792,552 B2 | 9/2010 | Thomas et al. | |
| 7,898,090 B1 | 3/2011 | Grant | |
| 7,898,413 B2 | 3/2011 | Hsu et al. | |
| 8,020,220 B2 | 9/2011 | McElroy et al. | |
| 8,020,989 B2 | 9/2011 | Jannard et al. | |
| 8,165,347 B2 | 4/2012 | Heinzmann et al. | |
| 8,203,502 B1 | 6/2012 | Chi et al. | |
| 8,223,024 B1 | 7/2012 | Petron | |
| 8,325,486 B2 | 12/2012 | Arshad et al. | |
| 8,399,781 B1 | 3/2013 | Pham et al. | |
| 8,411,448 B2 | 4/2013 | Shi et al. | |
| 8,467,133 B2 | 6/2013 | Miller | |
| 8,472,120 B2 | 6/2013 | Border et al. | |
| 8,477,425 B2 | 7/2013 | Border et al. | |
| 8,482,859 B2 | 7/2013 | Border et al. | |
| 8,488,246 B2 | 7/2013 | Border et al. | |
| 8,589,703 B2 | 11/2013 | Lee | |
| 8,613,111 B2 | 12/2013 | Condorelli et al. | |
| 8,696,113 B2 | 4/2014 | Lewis | |
| 8,733,927 B1 | 5/2014 | Lewis | |
| 8,750,558 B2 | 6/2014 | Lee et al. | |
| 8,814,691 B2 | 8/2014 | Haddick et al. | |
| 8,884,757 B2 | 11/2014 | sSason et al. | |
| 8,953,330 B2 | 2/2015 | Shi et al. | |
| 9,298,956 B2 | 3/2016 | Wade et al. | |
| 9,390,601 B2 | 7/2016 | Sasson et al. | |
| 9,406,208 B2 | 8/2016 | Dobbins et al. | |
| 9,489,668 B2 | 11/2016 | Jimenez | |
| 9,565,777 B1 | 2/2017 | Arvin et al. | |
| 9,591,768 B2 | 3/2017 | Brodsky et al. | |
| 9,591,776 B1 | 3/2017 | Brodsky et al. | |
| 9,600,693 B2 | 3/2017 | Klum et al. | |
| 2001/0056542 A1 | 12/2001 | Cesana et al. | |
| 2002/0186838 A1 | 2/2002 | Brandys | |
| 2002/0130673 A1 | 9/2002 | Pelrine et al. | |
| 2002/0130821 A1 | 9/2002 | Bronson | |
| 2002/0196554 A1 | 12/2002 | Cobb et al. | |
| 2003/0009683 A1 | 1/2003 | Schwenck et al. | |
| 2003/0009684 A1 | 1/2003 | Schwenck et al. | |
| 2004/0101178 A1 | 5/2004 | Fedorovskaya et al. | |
| 2004/0229199 A1 | 6/2004 | Ashley et al. | |
| 2004/0177658 A1 | 9/2004 | Mitchell | |
| 2005/0201585 A1 * | 9/2005 | Jannard | G02C 3/003 |
| | | | 381/381 |
| 2006/0152360 A1 | 7/2006 | Vatsaas et al. | |
| 2007/0052672 A1 | 3/2007 | Ritter et al. | |
| 2007/0067119 A1 | 3/2007 | Loewen et al. | |
| 2008/0089545 A1 | 4/2008 | Jannard et al. | |
| 2008/0180245 A1 | 7/2008 | Hsu et al. | |
| 2008/0285801 A1 | 11/2008 | Heinzmann et al. | |
| 2009/0008459 A1 | 1/2009 | Mainguet | |
| 2009/0065591 A1 | 3/2009 | Paul et al. | |
| 2009/0097688 A1 | 4/2009 | Lewis | |
| 2009/0231722 A1 | 9/2009 | Filipovich et al. | |
| 2010/0024046 A1 | 1/2010 | Johnson, Jr. et al. | |
| 2010/0097215 A1 | 4/2010 | Locher | |
| 2010/0171202 A1 * | 7/2010 | Tian | G06F 21/87 |
| | | | 257/679 |
| 2010/0180350 A1 | 7/2010 | Glaubert | |
| 2010/0182020 A1 | 7/2010 | Thornley et al. | |
| 2010/0315720 A1 | 12/2010 | Filipovich et al. | |
| 2010/0327856 A1 * | 12/2010 | Lowy | G06F 21/86 |
| | | | 324/207.16 |
| 2011/0031982 A1 | 2/2011 | Leon et al. | |
| 2011/0103585 A1 | 5/2011 | Tuck et al. | |
| 2011/0122563 A1 | 5/2011 | Hsu et al. | |
| 2011/0169932 A1 | 7/2011 | Mula et al. | |
| 2011/0187523 A1 | 8/2011 | Edelstein et al. | |
| 2011/0197327 A1 | 8/2011 | McElroy et al. | |
| 2011/0227603 A1 | 9/2011 | Leon et al. | |
| 2011/0279228 A1 | 11/2011 | Kumar | |
| 2012/0062241 A1 | 3/2012 | Rossi et al. | |
| 2012/0063046 A1 | 3/2012 | Rossi et al. | |
| 2012/0068914 A1 | 3/2012 | Jacobsen et al. | |
| 2012/0176220 A1 | 7/2012 | Garcia | |
| 2012/0212414 A1 | 8/2012 | Osterhout et al. | |
| 2013/0081127 A1 | 3/2013 | Chen | |
| 2013/0127980 A1 | 5/2013 | Haddick et al. | |
| 2013/0169683 A1 | 7/2013 | Perez et al. | |
| 2013/0278631 A1 | 10/2013 | Border et al. | |
| 2013/0283386 A1 | 10/2013 | Lee | |
| 2013/0286053 A1 | 10/2013 | Fleck et al. | |
| 2014/0085452 A1 | 3/2014 | Nistico et al. | |
| 2014/0138447 A1 | 5/2014 | Goldman et al. | |
| 2014/0267420 A1 | 9/2014 | Schowengerdt et al. | |
| 2014/0368343 A1 | 12/2014 | Dobbins et al. | |
| 2015/0037781 A1 * | 2/2015 | Breed | G09B 7/00 |
| | | | 434/362 |
| 2015/0097572 A1 | 4/2015 | Wade et al. | |
| 2016/0035223 A1 | 2/2016 | Breed | |
| 2016/0155679 A1 | 6/2016 | Davies et al. | |
| 2017/0042019 A1 | 2/2017 | Doyle et al. | |
| 2017/0185805 A1 | 6/2017 | Breed et al. | |
| 2018/0060613 A1 | 3/2018 | Breed et al. | |

FOREIGN PATENT DOCUMENTS

| | | | |
|---|---|---|---|
| WO | 2015148607 A1 | 10/2015 | |
| WO | 2016073202 A1 | 5/2016 | |
| WO | 2016028864 A1 | 7/2016 | |

OTHER PUBLICATIONS

Written opinion for International Application No. PCT/US2018/056869 dated Feb. 10, 2019.
Search strategy for International Application No. PCT/US2018/056869 dated Feb. 7, 2019.
International Search Report for PCT/US15/22390 dated Jul. 29, 2015 with Written Opinion.

(56) References Cited

OTHER PUBLICATIONS

International Search Report for PCT/US2015/045846 dated Dec. 7, 2015.
Written Opinion for PCT/US2015/045846 dated Dec. 7, 2015.
Search Report and Written Opinion for PCT/US2015/056710 dated Jan. 15, 2016.

* cited by examiner

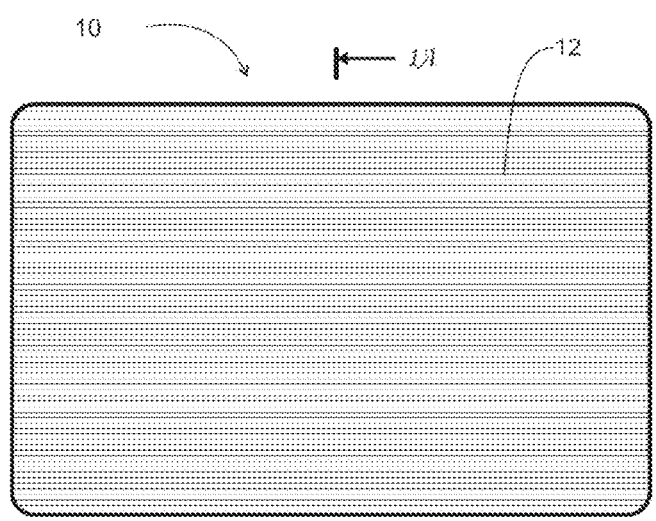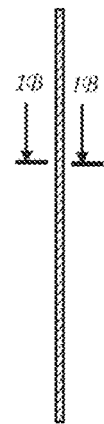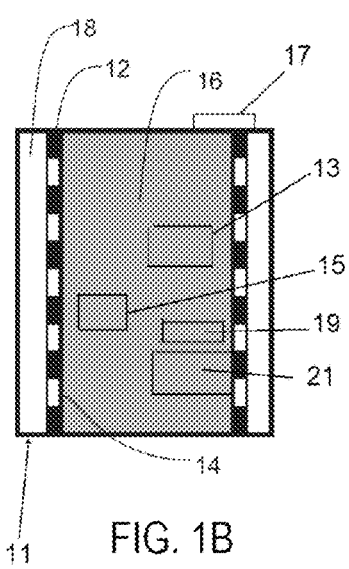
FIG. 1A
FIG. 1
FIG. 1B

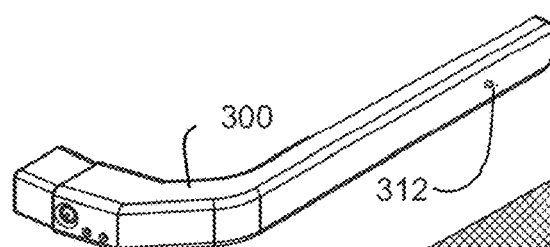
FIG. 7A
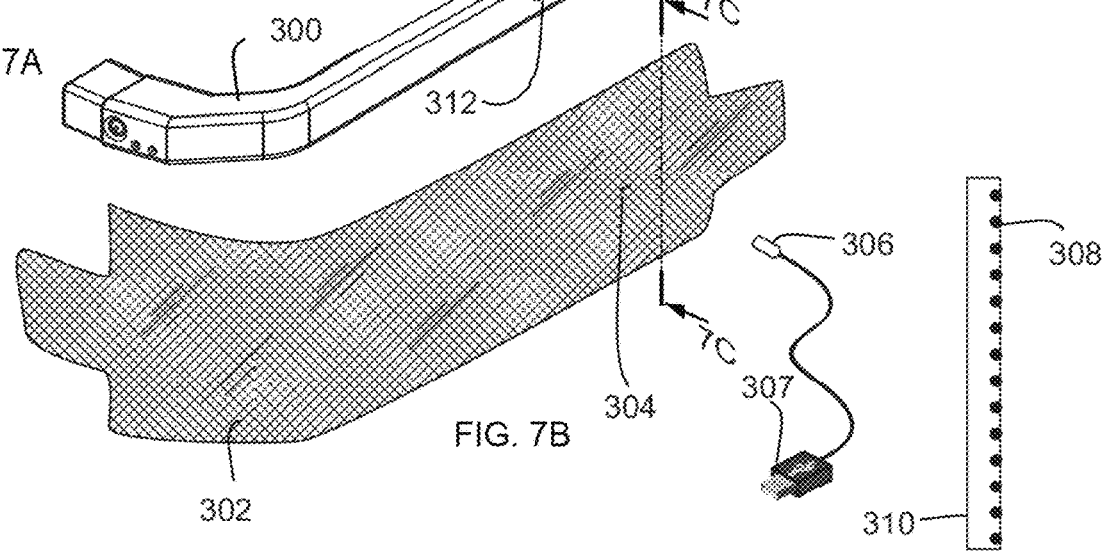
FIG. 7B
FIG. 7C
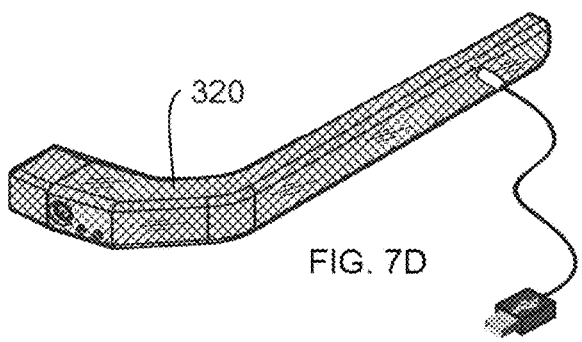
FIG. 7D
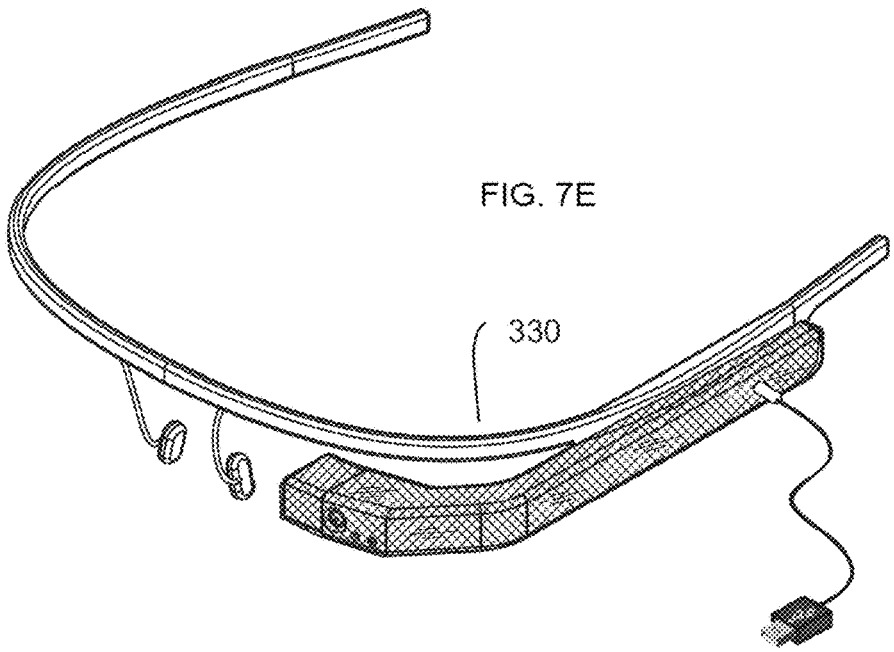
FIG. 7E

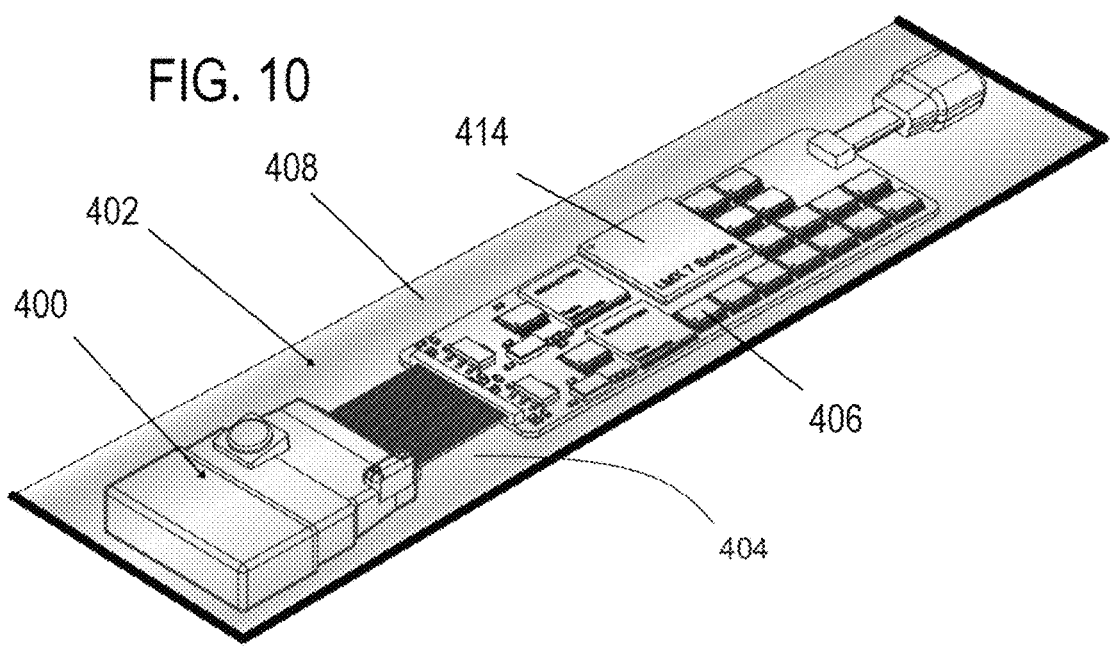
FIG. 10
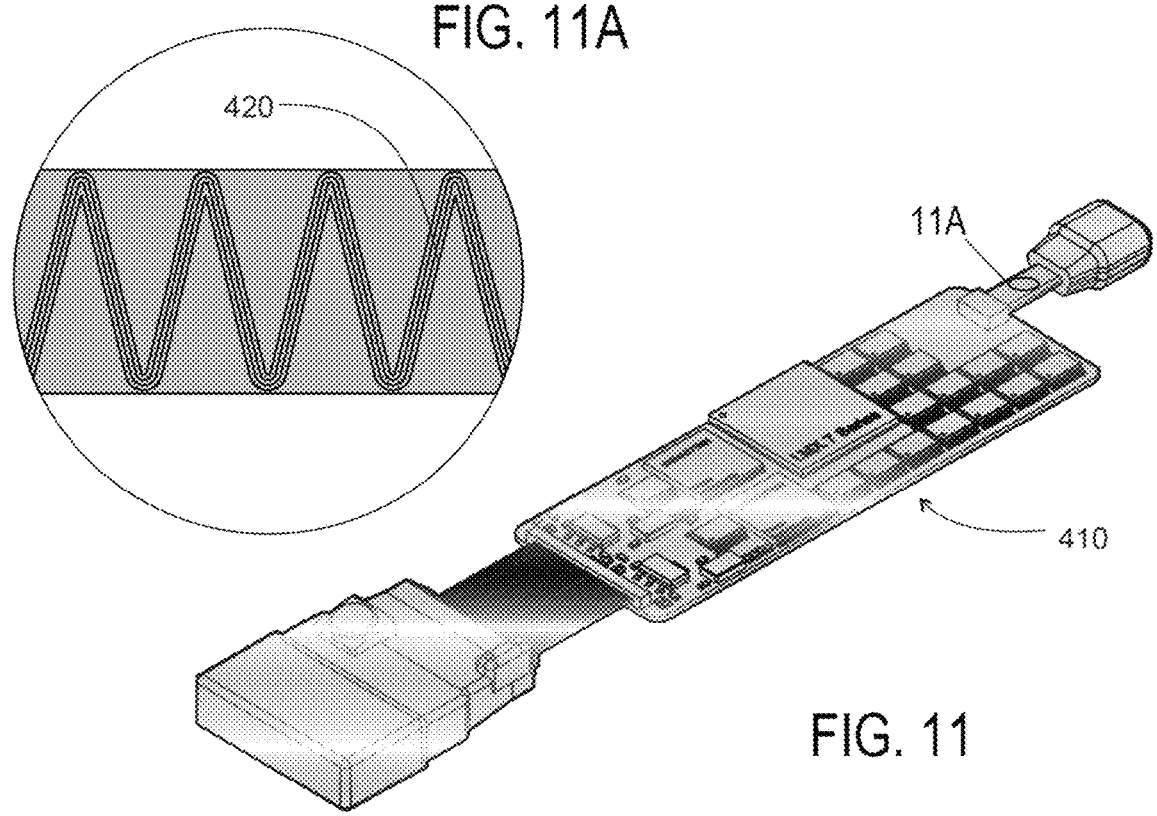
FIG. 11A
FIG. 11

INTRUSION-PROTECTED MEMORY COMPONENT

FIELD OF THE INVENTION

The present disclosure relates generally to the field of protecting cryptographic keys, biometric and other data on a memory component of a portable device to preclude use of the device in the event the device is stolen and the data is stolen and/or new data is sought to be incorporated into the device to enable its use.

BACKGROUND OF THE INVENTION

Smartphones are being used more and more for buying things using, for example, ApplePay™ and other systems. Smartphones are also getting more and more into biometrics, fingerprints, iris scans, and cryptography etc. A significant problem is that if someone loses their smartphone or it is stolen, the new possessor can substitute his/her biometrics for the original owner's biometrics and then clean them out of their money.

One solution to this problem is to store the biometric information on a remote site, but the thief can capture the owner's biometric data when it is sent to the remote site and then steal the device and input the captured data to spoof the system.

Other data may also need protection such as unique private keys of the owner which are stored on the device. If the device is stolen, then these private keys can also be stolen and used on other computing devices to allow access to information and assets which are intended only for the device owner. This permits the theft of cryptocurrency from digital wallets, for example.

SUMMARY OF THE INVENTION

One embodiment of the invention provides a system and method to protect the biometrics or other confidential information stored on a portable device with a chassis intrusion detector (CID) such that if the device is stolen or otherwise possessed by an unauthorized user, the new possessor cannot access or remove the recorded data and/or substitute new data and thereby enable use of any monetary or other value associated with the device. A method for protecting biometric data in such a memory component is also envisioned and considered part of the invention.

In one embodiment, the intrusion-protected memory-containing assembly includes a substrate, a data storage component and processor on the substrate, and a chassis intrusion detector assembly around the substrate. The chassis intrusion detector assembly includes a first plastic film, a mesh including conductor wires arranged on the first plastic film, and a second plastic film covering the mesh. The conductor wires may be formed and situated in a grid pattern throughout the first plastic film. The conductor wires are connected together in a single circuit with the processor to form a single transmission line. The second plastic film has sealed edges integrated with the mesh such that the edges are inseparable without breaking one of the conductor wires of the mesh. The processor takes action to prevent access to data in the data storage component upon detecting a variance in current through or impedance of the transmission line defined by the conductor wires caused by breaking of one of the conductor wires, e.g., causes the data storage component to self-destruct.

Additional components that may be arranged on the substrate, to enable the assembly to be used in a head-mounted test-taking apparatus, including a display, but then the chassis intrusion detector assembly should be transparent in a region over an active area of the display. Similarly, if an imaging component is arranged on the substrate, the chassis intrusion detector assembly should be transparent in a region over an active area of the imaging component. In one embodiment, the chassis intrusion detector assembly is substantially or entirely transparent.

If an access functionality is coupled to the substrate (a USB or similar connector) and enables access to the storage component, the processor could render the access functionality inoperable upon detecting the variance in current through or impedance of the transmission line defined by the conductor wires caused by breaking of one of the conductor wires and thereby prevent access to data in the storage component.

A method for protecting a data storage component mounted on a substrate from intrusion, with the substrate also including an optical component and a processor, includes placing a flat assembly around the substrate to form an enclosure with the substrate therein, the flat assembly being transparent in a region over an active area of the optical component and comprising a first plastic film, a mesh comprising conductor wires arranged on the first plastic film, and a second plastic film covering the mesh. The conductor wires are connected together in a single circuit with the processor to form a single transmission line whereby breaking of one of the conductor wires causes variation of current through or impedance of the transmission line detectable by the processor and allows the processor to take action to prevent access to the component. The, edges of the second plastic film are sealed and the sealed edges integrated with the mesh, or vice versa, such that the edges are inseparable without breaking one of the conductor wires.

Other steps include holding edges of the flat assembly together prior to sealing the edges of the second plastic film with an opening in one edge of the flat assembly, and then evacuating air from the enclosure through the opening and thereafter sealing the edges of the second plastic film. Sealing edges of the second plastic film may entail heating the flat assembly until an adhesive coating on opposing surfaces of the first plastic film that face one another to define the enclosure fuse together. If necessary, excess material is trimmed around the substrate. When a USB connector is attached to the substrate, the wires connected to the USB connector may be guided in a zig-zag or serpentine path underneath the mesh.

BRIEF DESCRIPTION OF THE DRAWINGS

The following drawings are illustrative of embodiments of the system developed or adapted using the teachings of at least one of the embodiments disclosed herein and are not meant to limit the scope of the disclosure as encompassed by the claims.

FIG. 1 is a drawing illustrating a memory component with a preferred chassis intrusion detector used in the invention.

FIG. 1A is a cross-sectional view taken along the line 1A-1A in FIG. 1.

FIG. 1B is an enlarged view of the section designated 1B-1B in FIG. 1A.

FIGS. 7A, 7B, 7C, 7D and 7E illustrate an application of the chassis intrusion detector to the device of FIGS. 6A and 6B, wherein FIG. 7A illustrates the housing, FIG. 7B illustrates the Chassis Intrusion Detector mesh, FIG. 7C is a partial cross section of the mesh taken along line 7C-7C in FIG. 7B, FIG. 7D illustrates the mesh wrapped or formed around the housing, and FIG. 7E illustrates the final assembly with the connector attached.

FIG. 10 illustrates one method of sealing edges of the CID of FIG. 9.

FIG. 11 illustrates another method of shrinking the CID around the assembly of FIG. 10.

FIG. 11A shows an enlarged view of the USB connection wires designated 11A in FIG. 11.

DETAILED DESCRIPTION OF THE INVENTION

Figure 2:
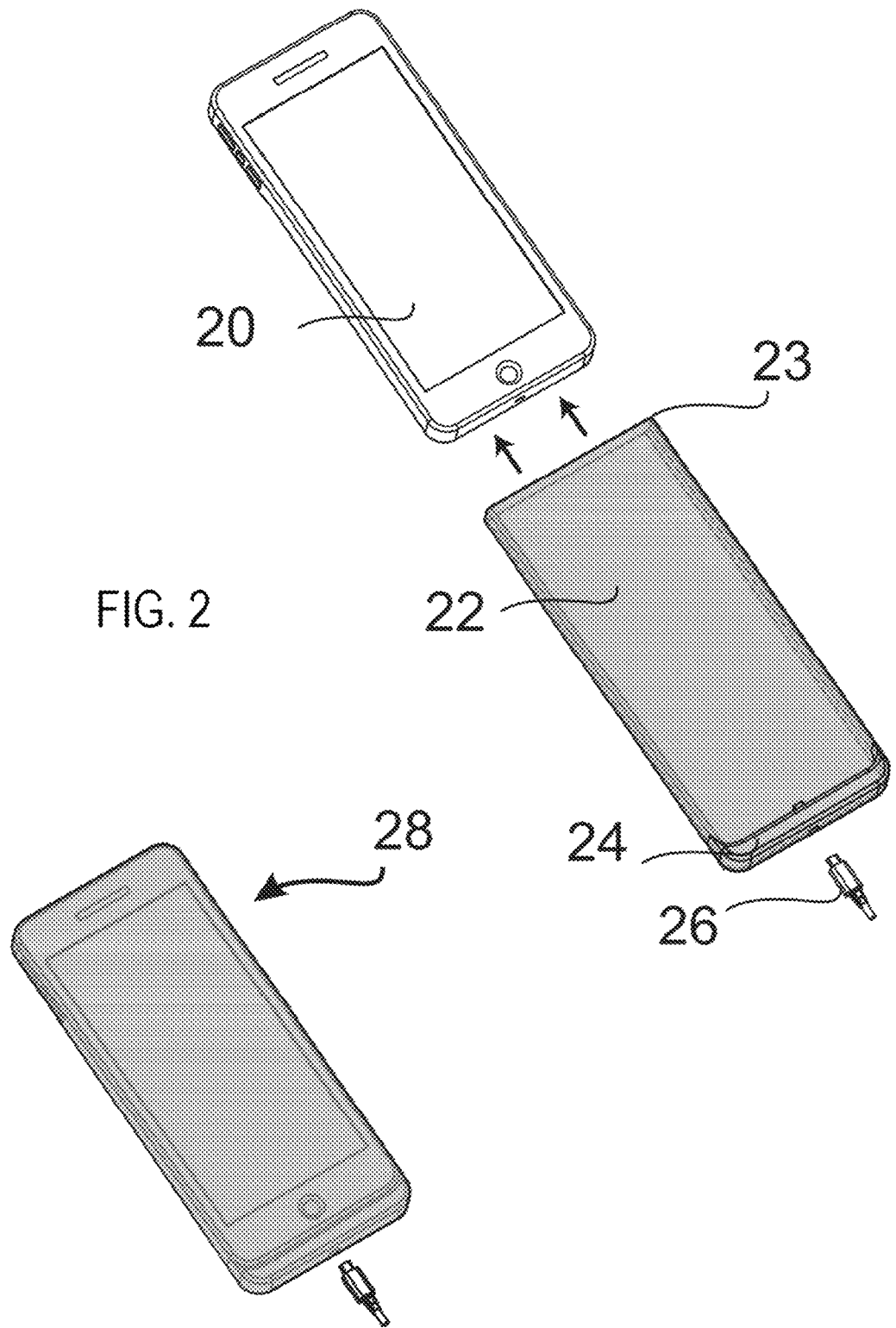
FIG. 2 is an illustration of the application of a chassis intrusion detector (CID) to protect a smartphone.

Referring to the accompanying drawings wherein like reference numbers refer to the same or similar elements, FIGS. 1, 1A and 1B illustrate a memory component 10 with a preferred chassis intrusion detector (CID) used in the invention. Memory component 10 typically comprises a housing 11 having an interior 16 including a substrate on which at least one data storage component 13, e.g., a RAM or ROM component only one of which is shown in FIG. 1B, is mounted and associated circuitry and electrical connects to enable access to the data storage component(s) 15. Housing 11 of the memory component 10 is covered with a series of parallel straight line conductors 12 which are spaced apart from each other, at least on the broad surfaces thereof, and not over an access portion 17 that enables access to the data storage component(s).

In another preferred implementation, wavy lines are used as conductors. Conductors 12, whether straight or wavy, may be spaced apart an equal distance from one another or at a variable spacing therebetween.

Conductors 12 are connected together to form a single completed transmission line where a current can pass to form a single complete circuit that totally engulfs the memory component 10. As shown in this implementation, conductors 12 are printed onto a thin film of plastic 14 which is bonded or otherwise attached to the outside of the memory component 10, e.g., the outer surface of housing 11 thereof, and protected with a protective plastic layer 18 that thus overlies conductors 12. The interior of the memory component 10 is represented at 16 in FIG. 1B. Although not illustrated, the conductors 12 can wrap around the edges of the housing 11 of the memory component 10.

Power providing system 19 is arranged at least partly in housing 11 to provide power to operate the circuit (similar to the power providing system shown in FIG. 3 described below). Processor 21 is arranged on, in or within housing 11 of memory component 10 and considered a part thereof. Processor 21 may be configured to render data storage component 15 inoperable upon detecting a variance in current through or impedance of the transmission line defined by conductors 12 caused by breaking of one of the conductors 12. More specifically, processor 21 may be configured to render data storage component 15 inoperable by, for example, causing data storage component 15 to self-destruct. It can also cause the only manner of accessing data storage component 15 to be destroyed, i.e., the coupling (e.g., USB) to data storage component 15, thereby preventing any access to data storage component 15.

Memory component 10 contains biometric or other data entered via a separate biometric data sensor, or other input device, that is configured to receive input from or related to a person authorized to use the device into which memory component 10 is inserted. For example, memory component 10 may be inserted into a smartphone having a fingerprint sensor or iris scanner (not shown) and the owner of the smartphone interacts with the fingerprint sensor or iris scanner to provide their biometric data which is provided to and stored in memory component 10.

In the illustration, the conductive lines are shown to be straight and opaque. In one preferred application, the lines are made wavy and sufficiently thin that the film onto which they are affixed appears to be transparent. The wires can be printed or otherwise applied from a variety of conductive materials such as aluminum, copper, indium tin oxide, and carbon-based materials such as graphene. These wires are connected so as to form a continuous circuit that totally surrounds the memory component 10. If any one of these wires is broken or the circuit is modified such as by shorting some of the wires, such that the circuit no longer conducts electricity or the circuit impedance is changed, then this fact is sensed by the CID circuitry (including a microprocessor) which causes memory component 10 to erase its contents and/or otherwise self-destruct. The manner for which a memory component 10 can self-destruct may be any known self-destruction method known to those skilled in this field. An example is the removal of power from a volatile memory such as RAM.

As an alternative to the wires used in FIG. 1, two layers of conductive material separated by a thin film can create a capacitor which also could be used to detect a breach in the surface of memory component 10. These conductive films can be made of indium tin oxide and be transparent. Since a carefully placed hole or multiple holes through the plastic film assembly can cause only a minor change in the capacitance, a preferred alternative construction, as illustrated in FIG. 1, is to replace the two conductive layers and separating plastic film with a single layer comprising a labyrinth of wires which are very narrow and closely spaced such that any attempt to penetrate the film will cause one or more of these wires to be cut. The microprocessor therefore monitors the total resistance, inductance or impedance of this circuit and causes memory component 10 to self-destruct if there is a significant change in these measurements. Even the shorting of a subset of these wires accompanying an attempt to open an access hole without breaking the circuit is detectable by the monitoring circuit. It can also cause the only manner of accessing the memory component 10 to be destroyed thereby prevent any access to the memory component 10.

Since any attempt to break into memory component 10 will necessarily sever one of these wires or change the circuit impedance, this design provides an easily detectable method of determining an attempt to intrude into memory component 10.

A representative application of the use of a CID of this invention is to protect a smartphone as shown in FIG. 2. A smartphone 20 is covered by a CID 22 containing appropriate circuitry including a microprocessor as the processor, conductors, battery as the power providing system and memory component 24 (similar to RAM memory 42 described below). Prior to installation with smartphone 20, CID device 22 is made as one piece including an open end 23 and has a shape to fit snugly over the smartphone 20. The smartphone 20 is inserted into the open end 23.

Then, the open end 23 of the CID device 22 is folded over during assembly and cemented in place yielding the final assembly 28. The space between the CID and the smartphone can then be evacuated and attached to the smartphone using a heat activated adhesive. CID device 22 covers the entire smart phone except for the access port for connector 26 which is not covered by CID device 22. CID device 22 does not have any part that penetrates into the smartphone 20, but rather only overlies it. CID device 22 is a self-contained unit in which memory component 24 contains the data relating to value of the smartphone 20. When the conductors of the CID 22 are disturbed, the processor of the CID 22 causes the memory component 24 to erase its data and/or self-destruct. It can also cause the only manner of accessing the memory component 24 to be destroyed and thereby prevent any access to memory component 24. Access to the data on memory component 24 is via usual techniques involving smartphone, e.g., NFC, as well as the providing of the data to the memory component 24 which is to be secured.

Figure 3:
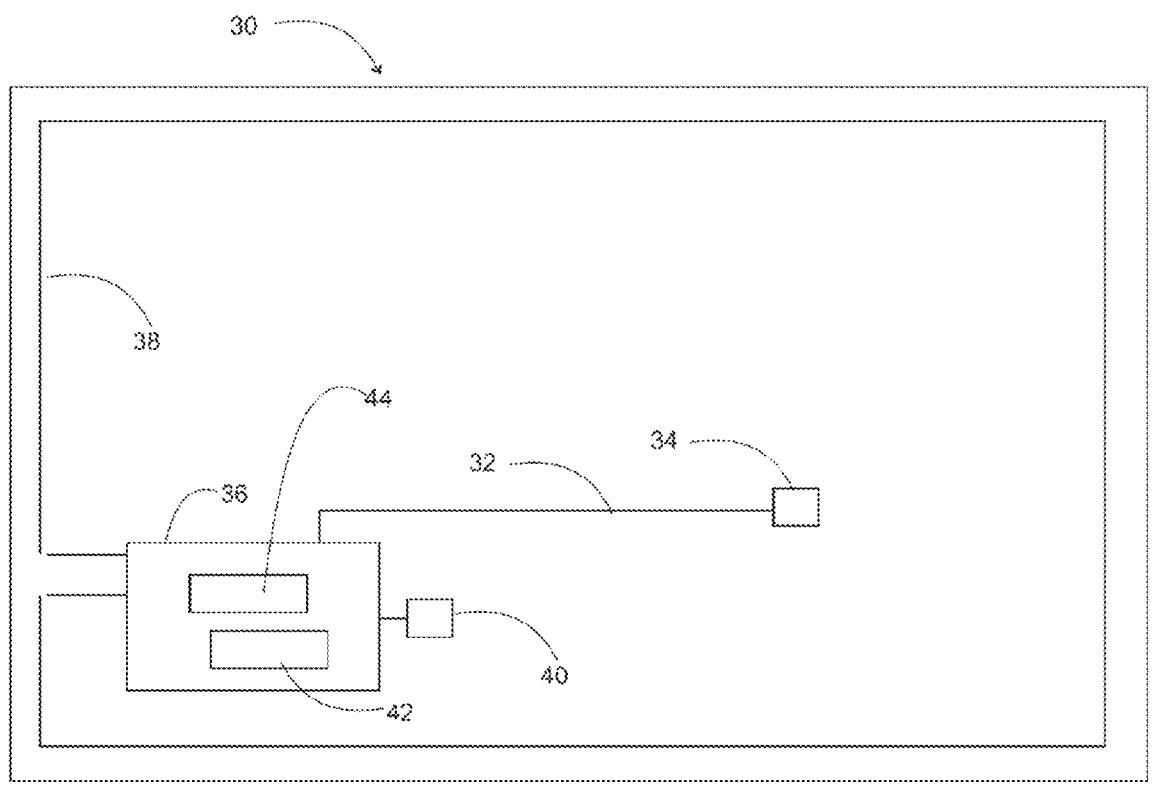
FIG. 3 is a schematic of the chassis intrusion detector electronics embedded within the memory component.

A schematic of another example of a chassis intrusion detector system for use with a smartcard is shown in FIG. 3 generally at 30. Power to operate the circuit can be supplied from a rechargeable battery or an external device such as the NFC (power providing system) through a wire 32 to an antenna 34 which couples to the NFC reader, not shown. Wire 32 also provides communication from the electronics and sensors assembly of which the security assembly (SA) 36 is a part. The fine wire maze is shown schematically at 38, the SA at 36, a long-life battery at 40 and a RAM volatile memory at 42. Long-life battery 40 is present to provide sufficient power to operate the SA 36 for the life of the memory component 10, typically 5-10 years.

SA 36 can be a separate subassembly which is further protected by being potted with a material such that any attempt to obtain access to the wires connecting battery 40 to a microprocessor 44 therein or to RAM memory 42 would be broken during such an attempt. This is a secondary precaution since penetration to SA 36 should not be possible without breaking wire maze 38 and thus causing self-destruction of RAM memory 42. The power can be removed by microprocessor 44. It can also cause the only manner of accessing the RAM memory 42 to be destroyed thereby prevent any access to the RAM memory 42.

To summarize, any disruption of the mesh or conductive film in either of the above described examples will cause self-destruction of the contents of the memory component 10 with a chassis intrusion detector (CID) microprocessor making it impossible to decode the data sent from the smartcard issuer who will therefore deny transaction approval. After the assembly is completed, the microprocessor 44 can be powered on and the first step will be to measure the inductance, resistance, and capacitance, as appropriate, of the mesh or films. If any of these measurements significantly change, the circuit in SA 36 would remove power from RAM memory 42 thereby causing self-destruction of the contents of the RAM memory 42. Once the data has self-destructed, any value residing in the smartphone or smartcard or similar device in which the memory component 10 is situated, would not be usable. A thief could thus not use the smartphone, for example, to purchase items or to spend resident bitcoins. In the bitcoin case the bitcoin codes would need to be also stored elsewhere to prevent their irretrievable loss.

When the SA 36 is loaded with the biometric or other data during manufacture or thereafter, it can be done so through two fused links, not shown, which can be broken after the loading process has occurred and been verified. Thereafter, the biometric or other data in the memory component 10 cannot be changed or reloaded.

Figure 4:
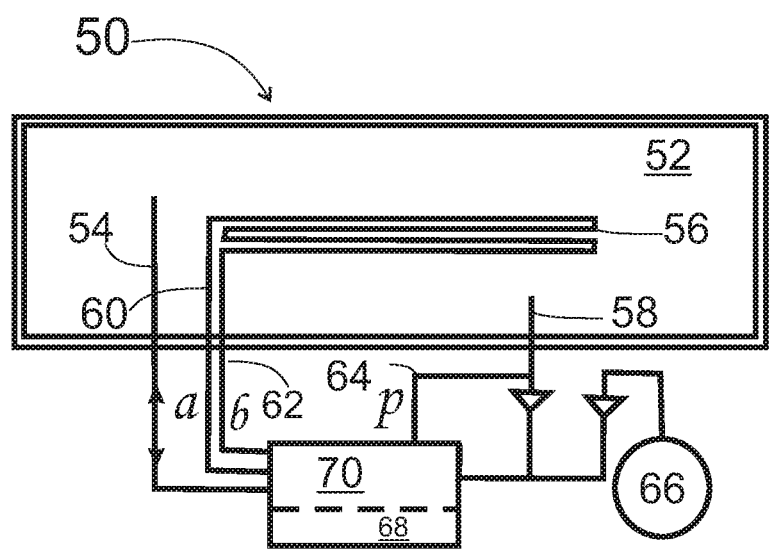
FIG. 4 is an example of a corresponding electronic circuit and its use applied to a smartcard using the chassis intrusion detector electronics shown in FIG. 3.
Figure 4:
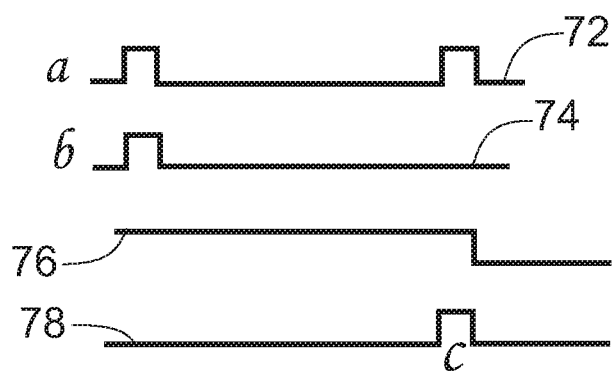

FIG. 4 illustrates the circuit of the memory component containing the SA generally at 50. The memory component is illustrated at 52 and the SA microcomputer and RAM, for the volatile memory implementation, at 70 and 68, respectively. The long-life battery that powers the SA for several years is illustrated at 66. 64 is a signal that indicates that power is available for the memory component 52. This power can be supplied by a rechargeable battery located on the memory component 52 or by the NFC reader through an antenna, not shown, on the memory component 52. The system is designed such that if power is available from the memory component 52, its voltage will be higher than that from the battery 66 and therefore the total power needed to supply the microprocessor 70 will come from the external source.

In this manner, battery 66 has its life extended. Bidirectional serial communication takes place through wire 54. A testing pulse is imposed on the mesh 66 through wire 60 labeled a. The returned signal comes through wire 62 labeled b. The pulse at a is shown at 72 and can consist of a 20 µs burst which is repeated every second, or at some other convenient value. The signal indicated by the trace 74 illustrates the integrity of the mesh at the beginning where it responds with an attenuated 20 µs pulse. However, after the one second, or other appropriate time period, when the second pulse arrived and was not sensed by the microprocessor 70, b did not register a corresponding pulse indicating that the wire mesh had been severed.

Signal 76 indicates that the private key (PK) is present in the RAM (PK in RAM) and, due to the failure of the mesh at the second burst pulse, the RAM, and thus the PK, was cleared (RAM Clear). Trace 78 indicates that a message was sent to the memory component 52 indicating that intrusion had taken place.

Figure 5:
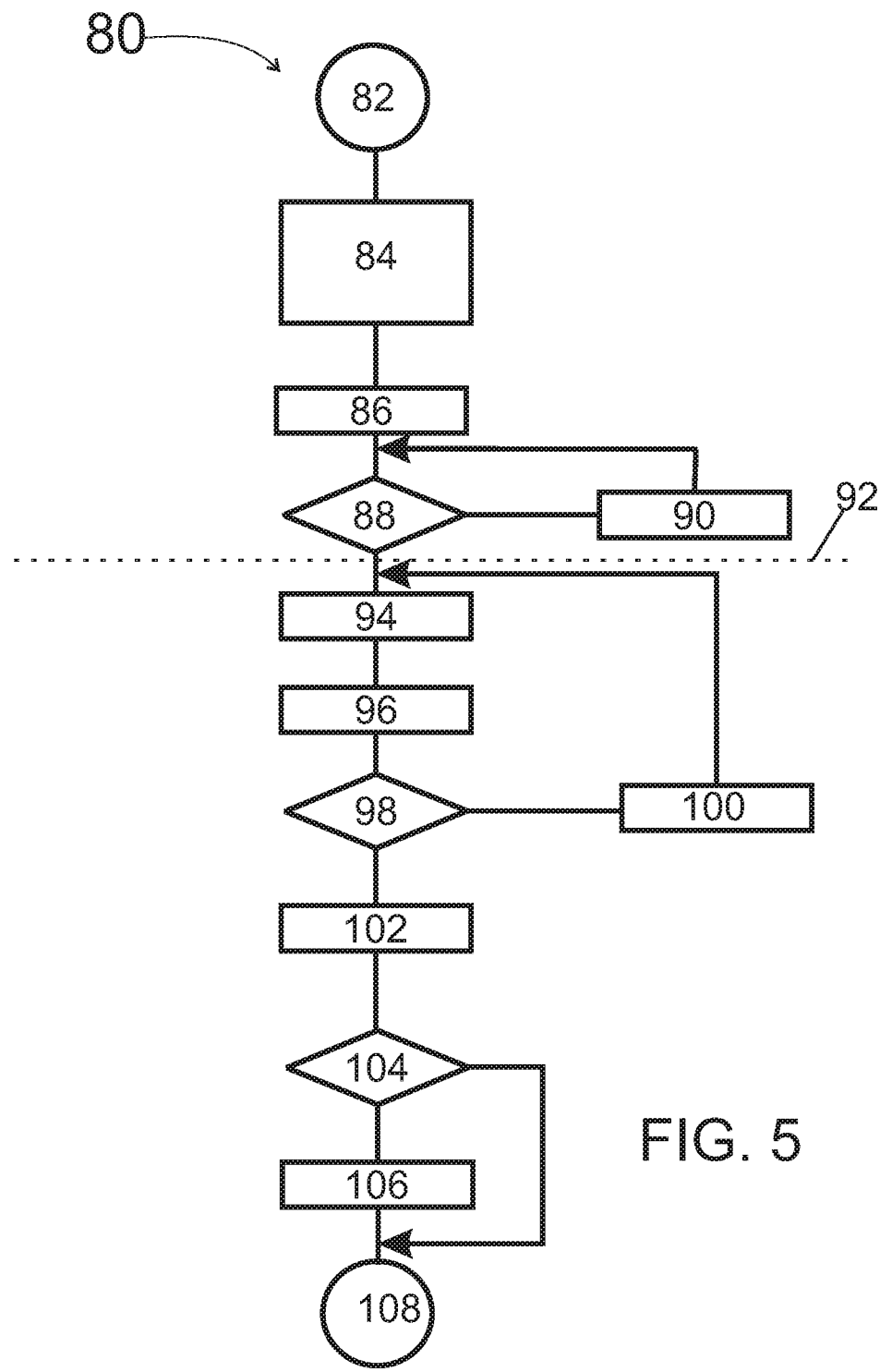
FIG. 5 is a flowchart explaining operation of the electronic circuit to the chassis intrusion detector electronics shown in FIG. 4.

A flowchart of this process is shown generally at 80 in FIG. 5. The process starts at step 82 and at step 84, the microprocessor in the SA is programmed and the data is loaded into RAM. If the memory component is designed so that the data can only be loaded once, then the fuses are also blown at step 84. The power available indicator P is then set to zero indicating that the rechargeable battery has not been charged nor is the memory component receiving energy from another external source such as the near field reader.

Note that the same antenna which harvests power from the near field reader can be used to receive power from any available charging source.

At step 86, the SA microprocessor is started, however the every one second pulses will not be initiated. This is to conserve power of the SA battery. Sensing of power from the memory component, indicated here as P equals one, is used to indicate the once per second pulses have started. This is indicated by the dashed line 92. Although the pulse time period of once per second has been chosen in the above example, other shorter or long time periods can be chosen for this or other applications.

At step 94, the 20 μs pulse is driven onto conductor a and conductor b is tested for presence of the signal at step 96. If conductor b received the pulse indicating that integrity of the wire mesh is intact, the decision is made at step 98 to transfer control to step 100 where the one second delay occurs after which control is transferred back to step 94. If no signal was sensed on b, then step 98 transfers control to step 102 where the biometric data, private key and any other information, is erased from RAM. Control is then transferred to step 104 where a check is made as to whether power is available from the memory component and if so a message "intrusion" is sent to the memory component at 106. In either case, the process terminates at step 108 where the microprocessor is turned off.

Figure 6A:
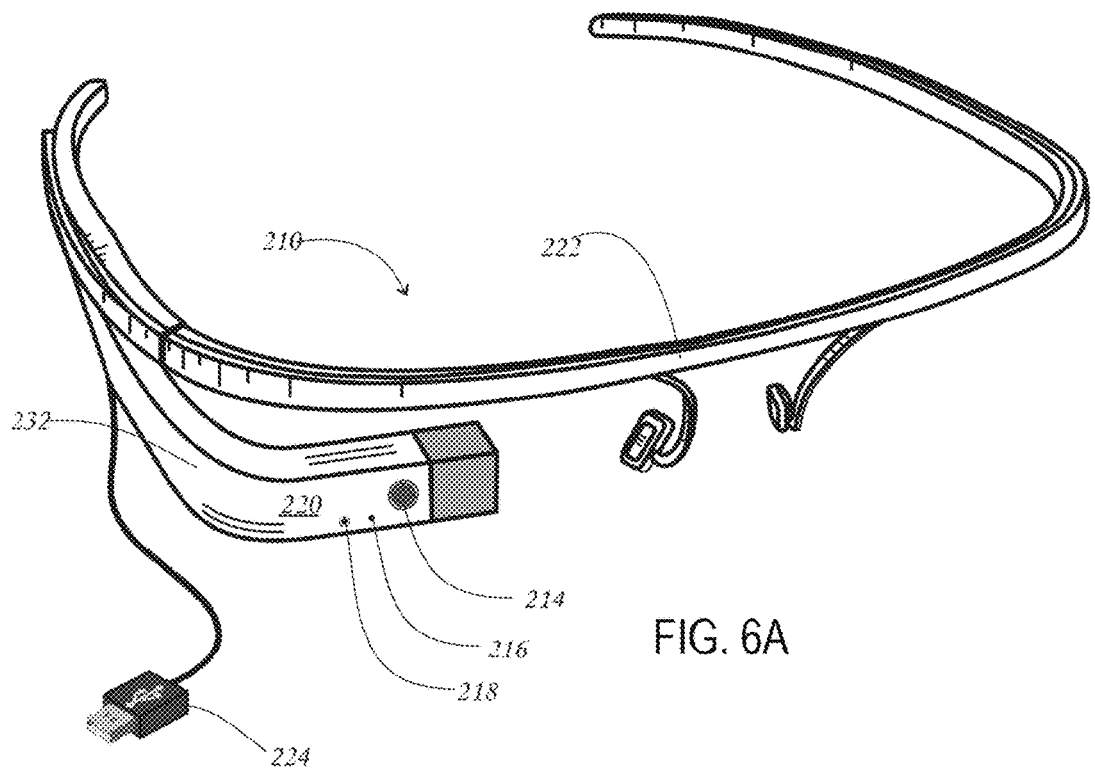
FIGS. 6A and 6B are illustrations of a secure testing device from WO2016028864.
Figure 6B:
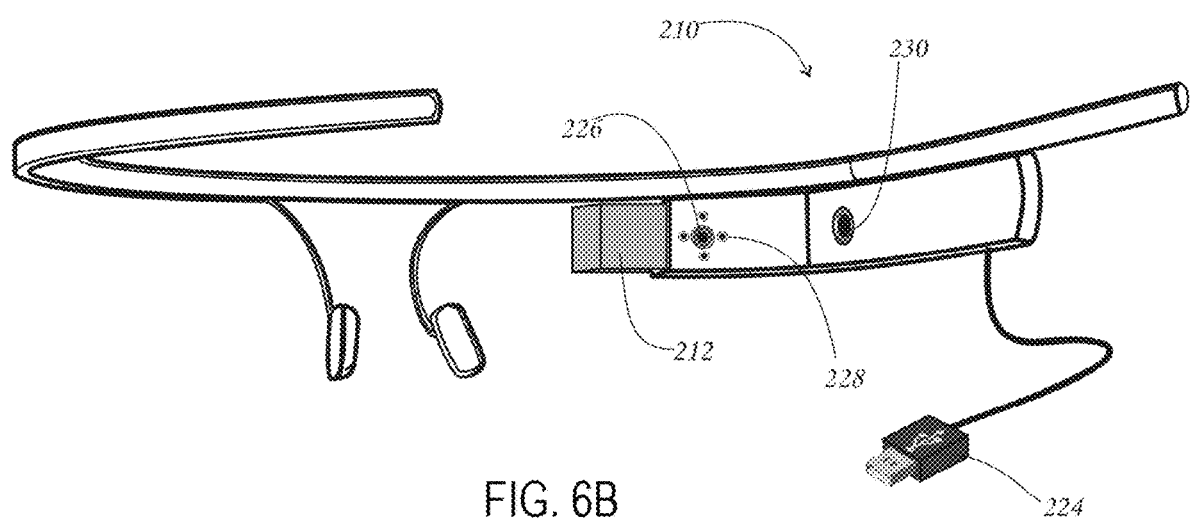

An example of the application of the CID for use with a testing device as disclosed in WO2016028864 and illustrated in FIGS. 6A and 6B, is illustrated in FIGS. 7A-7E.

A device constructed in accordance with the teachings of the invention of WO2016028864 is illustrated in FIG. 6A which is a perspective view of a head worn glasses type device, the Test Glasses, containing an electronics assembly with several sensors, cameras and a display all protected with a chassis intrusion detector prepared using the teachings herein. A head worn display and electronics device constructed in accordance with the invention is shown generally at 210 in FIGS. 6A and 6B.

Housing 220 extends from a frame 222, which has head band shape. Housing 220 is substantially L-shaped with a first portion extending straight outward from an edge of the frame 222 and second portion approximately perpendicular to the first portion and positioned in front of the frame 222.

A display 212 is arranged on or in the housing 220 and pointed toward the right eye of the wearer, e.g., a test-taker, and displays test questions (although alternatively, a display can be pointed toward the left eye of the test-taker). A forward viewing camera 214, representative of one or more imaging devices, is also arranged on or in the housing 220 and monitors the field of view of the wearer outward from the device 210. Camera 214 can have a field of view of approximately 120°. A microphone 216, representative of one or more sound detectors, is also arranged on or in housing 220 and monitors talking (sounds) which can take place while the test is in progress, e.g., while test questions are displayed on display 212. A sound maker or speaker 218, representative of one or more sound generators, is arranged on or in the housing 220 and periodically provides a sound detectable by the microphone 216 so as to verify that the microphone 216 has not somehow been rendered inoperable.

Display 212 is arranged at a terminal end of the second housing portion. The forward viewing camera 214, or more generally at least one imaging device, the microphone 216 and the speaker 218 are also arranged on or in the second housing portion (see FIG. 6A).

Each of these components 212, 214, 216, 218 is connected to a processor-containing electronics package in housing 220 which is mounted to the glasses frame 222 in a manner known to those skilled in the art to which this invention pertains. A cable emanates from the electronics package in housing 220 and can contain a USB connector 224 for connecting onto an external device such as a computer.

An iris or retinal scan camera 226 is arranged on housing 220, pointing inward toward the wearer, and measures biometrics of the test-taker (see FIG. 6B). Such biometrics can include an iris or retinal scan or a scan of the portion of the face surrounding the eye. Illumination of the eye can be provided by one or more LEDs 228 arranged on the housing 220 which can be in the IR or visible portions of the electromagnetic spectrum or both. Two or more different levels of visible illumination can be provided to cause the iris to be seen at different openings to check for an artificial iris painted onto a contact lens. The iris scan camera 226 and LEDs 228 are arranged on the second housing portion (see FIG. 6B).

Other aspects of the Test Device are disclosed in WO2016028864 which is included herein by reference.

The entire electronics package of the device 210 is encapsulated in a thin film 232 called a chassis intrusion detection film (similar to or the same as disclosed above). Specifically, this film can comprise an array of wires which can be printed or otherwise affixed, onto a plastic film either before or after it has encapsulated the electronics package in housing 220 in such a manner that any attempt to break into the housing 220 will sever or otherwise disrupt one or more of the wires. The wires can be made from indium tin oxide or graphene and thus be transparent. The wires can be thin, such as about 0.001 inches wide, and have a similar or larger spacing such as 0.005 inches. In some cases, the wires can be made as small as 1 micron (40 microinches) and can be made of materials such as graphene, copper, silver or gold and still be transparent depending of the spacing of the wires. Transparency is desirable since the film can extend over the camera lenses and the display.

The housing, prior to attachment of the CID, is illustrated at 300 in FIG. 7A. Pins for connecting the electronics inside the housing 300 to the connector 306 are illustrated at 312. Although not shown, additional short pins for connecting the CID circuitry to the mesh 302 can be in the form of short sleeves around the pins 312. The wire mesh making up the CID is illustrated in FIG. 7B generally at 302. Holes 304 are provided in the mesh 302 to allow two or more pins 312 (shown as two in this illustration) to pass through the mesh 302 without contacting the mesh wires (an access functionality). Although not illustrated, since the holes register the mesh 302 to the housing 300, terminating ends of the mesh 302 can attach to corresponding circumferential pins on the housing 300 used for providing power and monitoring the impedance of the mesh 302 by the processor-containing electronics package in housing 300. This can be facilitated if the holes in the mesh 302 are made conductive with one attaching to each end on the wire transmission line in which case the pins coming though the holes would be insulated from the conductive holes. Many other methods for accomplishing the functions of connecting the interior CID circuit (including a processor) to the mesh 302 and for allowing pins to pass thought the mesh 302 to facilitate the connector 306 connection to the housing 300 will now be obvious to one skilled in the art. An alternative approach is described below.

FIG. 7B also illustrates the connector 306 for connecting to the electronic circuit within the housing and the USB connector 307 for connecting to an external computer or other device. Other connector types can of course be used.

FIG. 7C illustrates a portion of a cross section of the CID mesh and is comprised of conductor wires 308 and film 310. The wires 308 (not shown to scale) can be printed onto the film 310 or attached or created by some other convenient method. The film 310 can be made from plastic material such as polyimide coated with a cyanoacrylate UV curable or a thermal setting adhesive which is in the uncured state prior to wrapping or forming around the housing 300. The film 310 can be about 0.003 thick for the polyimide and about 0.002 thick for adhesive for a total thickness of about 0.005 which can be increased up to about 0.01 inches thick or reduced to a total of 0.002 (0.001 of polyimide and 0.001 of adhesive) or less, if the application warrants, such that when cured it forms a strong substance to hold the wires and permit wear and substantial abuse to the assembled housing package without damaging the wires. The wires are near one side of the mesh assembly and that side is assembled against the housing 300 allowing for the main film thickness to be on the outside.

FIG. 7D illustrates the housing 300 after it has been covered by the CID mesh 320 and with the connector and wire assembly attached. After the mesh 302 has been wrapped or formed around the housing 300, it is preferably exposed to UV radiation which cures the adhesive forming a continuous covering of the housing 300. Any attempt thereafter to obtain access to protected data within the housing 300 by a physical entry into the housing 300 will sever one or more wires of the mesh 302 resulting in the destruction of the data as described above. FIG. 7E illustrates the final assembly onto a supporting head band frame 330. This assembly permits the full functioning of the cameras, display, microphone, speaker etc. that must operate through the CID while simultaneously protecting the data housed inside the device from unwanted exposure.

In embodiments described above, there is a memory in the CID, or more generally a data storage component, which houses the private key or biometric information. For example, the memory may be housed in the housing 300 (or memory 24 or 42). The data storage component can be RAM which needs power or it loses its memory contents. It is called "volatile" memory for that reason. Thus, when power is no longer supplied to the RAM as a result of detection of intrusion into the housing 300, the RAM loses its memory contents (to thereby achieve objectives of the invention). The invention is not restricted to having the biometric memory in the CID memory, but it is one possible location.

Another example of the secure testing device discussed above with respect to FIG. 6A-7E, is illustrated in FIGS. 8-15.

Figure 8:
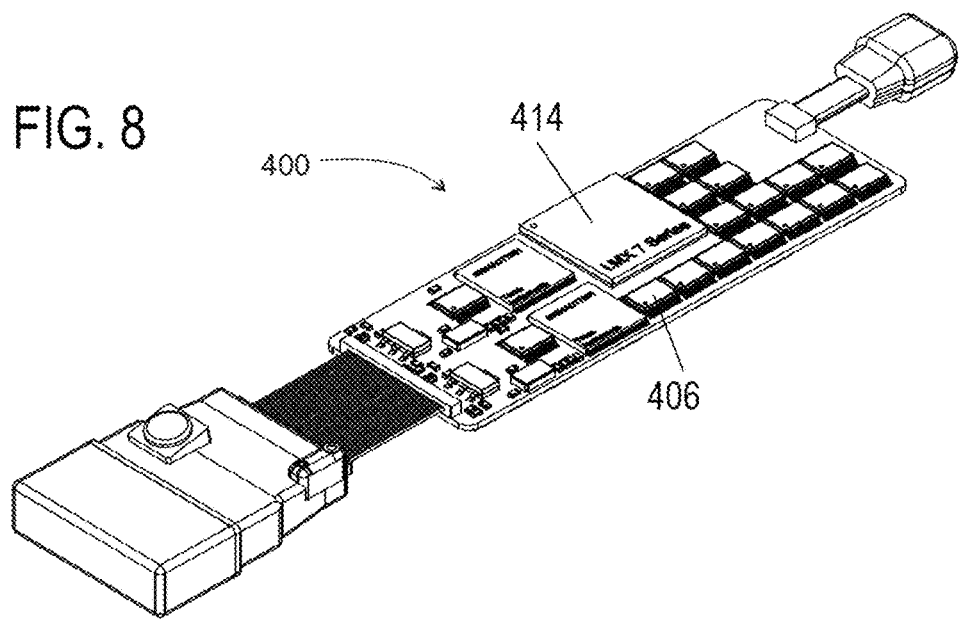
FIG. 8 illustrates the internal assembly showing the electronics of a secure testing device prior to adding the CID.

FIG. 8 shows the internal assembly of the device prior to adding the CID 402, generally on a substrate at 400, which includes at least one data storage component 406, and other microelectronic components, such as a display, imaging component and other components described above.

Figure 9:
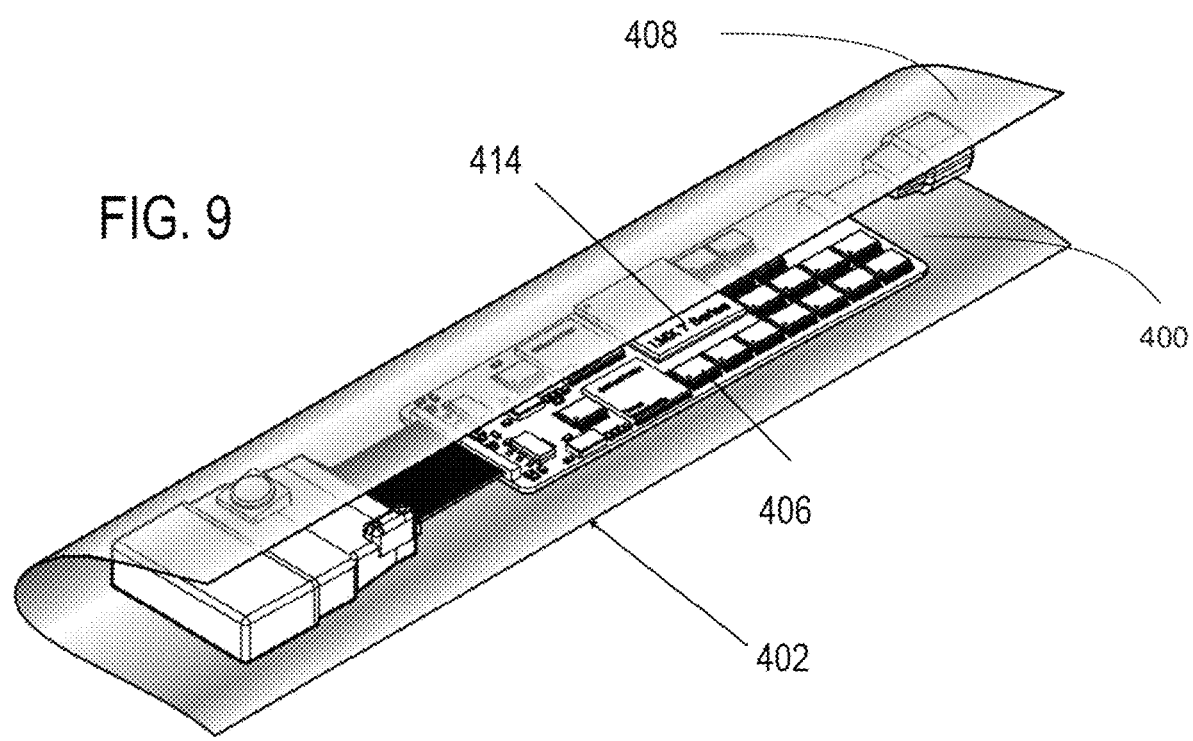
FIG. 9 illustrates placement of the CID (chassis intrusion detector assembly) around the electronics assembly of FIG. 8 as an initial step of the assembly process.

In FIG. 9, CID 402 in the form of a flat assembly is placed around the assembly 400 of FIG. 8. This may be achieved by placing the chassis intrusion detector assembly on a flat, horizontal surface, putting the assembly 400 on the CID assembly and then folding the CID assembly over the assembly 40 with all edges roughly aligning. The CID assembly can of course be produced in a specific size relative to the assembly 400 to ensure it covers the assembly 40, with minimal or no excess.

The CID 402 is made substantially transparent since it covers various optical imaging and viewing components such as cameras and a display. By being substantially transparent, it is meant that a significant portion of the CID 402 is made of transparent material or that the CID 402 is mostly transparent yet not completely transparent over its entirety. It is possible to make the CID 402 entirely of transparent material. It is also possible to make the CID 402 only partly of transparent material with one or more specific portions that do not require transparency being made of opaque material.

For this application, the conductor wires of the CID 402, not visible, can be 0.001-0.002 inches thick and separated by 0.005-0.010 inches. The material for the plastic film 408 on which the conductor wires are arranged can be transparent polyamide and the conductor wires are made from a conductive material used for wires, such as copper. Normally, polyamide has a brownish orange color but can be made in a transparent form and is available from, for example, INVISTA (sold under the tradename NOVADYN). If additional transparency is desired, the conductor wires can be made from indium tin oxide or graphene. The conductor wires can be applied to the plastic film 408 by a printing process or by plating a film of metal and then, using the photoresist process, etching away the excess material to thereby obtain conductor wires in the desired pattern. The wire side of the film can then be coated with an adhesive as described above. If this is placed on the inside of the CID 402, all the polyimide thickness is available to protect the wires from wear and abuse.

The polyimide also forms an appropriate material for the base for the remainder of the CID circuit as described above. Alternately, the CID circuit (e.g., processor 414) can be constructed as part of the main electronic assembly 400, in which case, it can be soldered to the CID 402 if appropriate solder bumps, or other small connecting surfaces, are overprinted or otherwise affixed to, or otherwise made part of, the CID 402. The conductor wires of the CID 402 are connected together in a single circuit with the processor to form a single transmission line whereby breaking of one of the conductor wires causes variation of current through or impedance of the transmission line detectable by the processor and allowing the processor to take action to prevent access to the memory component. The connection of the conductor wires of the CID to the processor may occur before or after the flat assembly of the CID 402 is placed around the device 400. It would be easier to do it before, or possibly during, enclosing of the device 400 by the flat assembly of the CID 402.

The battery can similarly be made part of the main electronics assembly 400 or separately attached to the CID 402. The wire mesh is not visible in FIGS. 9-13. It can take several forms. As illustrated in FIG. 1, the wires or the mesh can be created as parallel lines or in a serpentine or other pattern. The overall form of the wire mesh can be rectangular as in FIG. 10 or it can be made to follow the shape of the object to be protected as in FIGS. 11-13. In the first case, substantial excess CID film will be present to be folded over and accommodated in the housing whereas in the second case, the CID 402 will need to be die cut to remove the excess material prior to assembly in the housing.

FIG. 10 illustrates the chassis intrusion detector assembly just prior to sealing with the edges 404, marked in black, of the CID 402. The edges of the flat assembly are held together (such as by gluing or application of another type of adhesive), but not yet sealed and integrated into the mesh and a small evacuation opening remains or can be formed in one sealed edge. The enclosure formed by the flat assembly with the CID 402 therein can now be evacuated of air by inserting a suction device, or part thereof, through the opening in the sealed edge, and the structure then suitably heated until an adhesive coating on the inside surfaces of the CID 402 that face one another fuse together. The excess material can then be trimmed to arrive at the final assembly 410 as shown in FIG. 11, if necessary. The edges of the flat assembly may be closed at all locations except for at the access functionality, i.e., the opening of the USB connector. The enclosure may then be evacuated of air alongside the access functionality. The access functionality is preferably not closed or covered by the chassis intrusion detector assembly, but remains open for connection to anther device.

FIG. 11A is an enlarged view of one geometry of the USB connection wires 420. Since the USB connection wires 420 will have a larger cross section area than the CID wires, it might be possible to gain access through these wires if they follow a straight path to the interior electronic package. To prevent this, the USB wires 420 are covered with the CID and follow a zig-zag or other serpentine path making it very difficult to separate the CID 402 enough to gain access to the interior electronics without breaking one of the CID wires.

An important aspect of the invention is that the sealed edges of the chassis intrusion detector assembly are integrated with the mesh of conductor wires such that the edges are inseparable without breaking one of the conductor wires. Otherwise, one could simply separate a sealed edge and access the memory component. Thus, formation of the sealed edges requires the conductor wires to be integrated into the seal. It is possible to form the sealed edges and then use the processor to determine the current or impedance through the circuit including the conductor wires to use as a baseline to detect a variance indicative of an attempt to improperly access the memory component.

Figure 12:
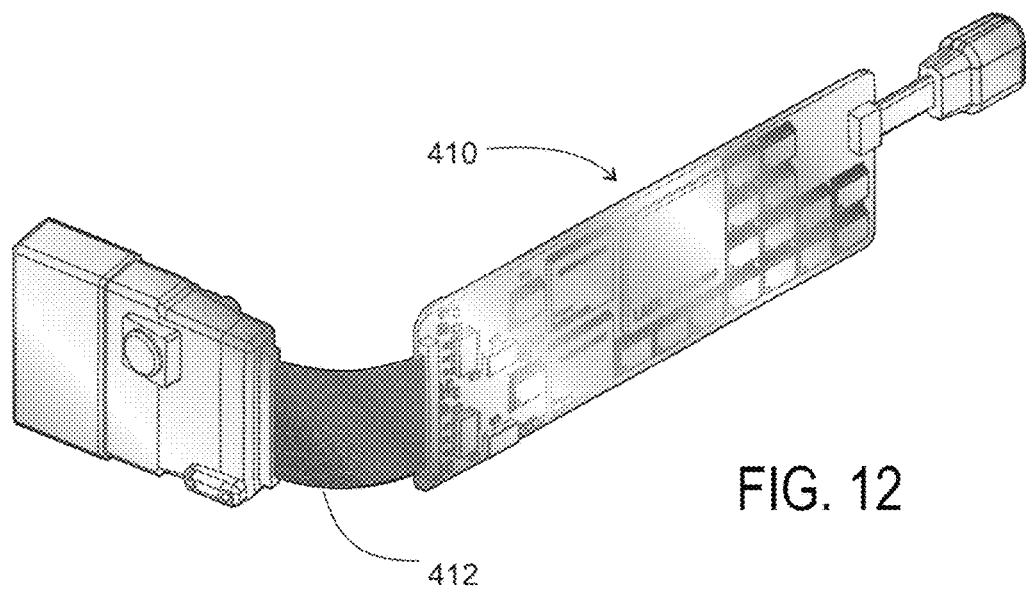
FIG. 12 illustrates bending of the assembly of FIG. 11 prior to insertion into a protective housing.
Figure 13:
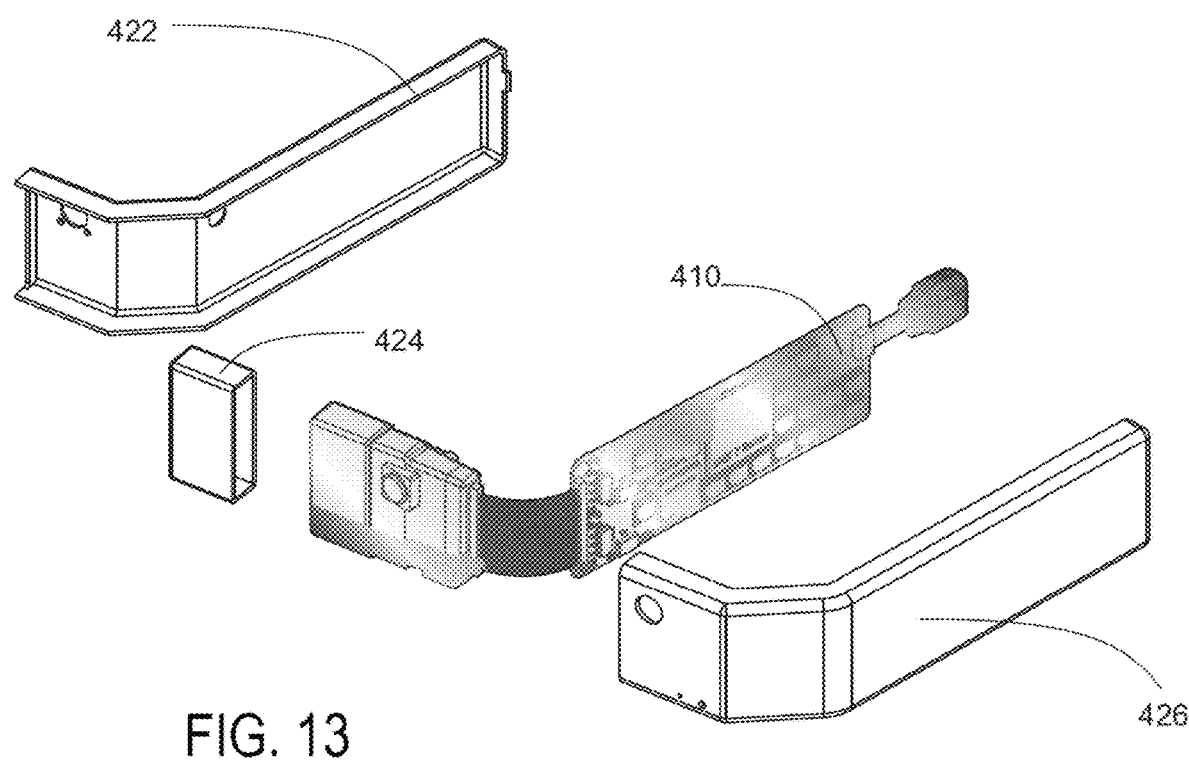
FIG. 13 illustrates a housing about to be used for enclosing assembly of FIG. 12.

In FIG. 12, the assembly of FIG. 11 is bent at section 412 to prepare it for assembly into the housing parts 422, 424, 426 as shown in FIG. 13. Housing parts 422, 434, 426 are connected together by suitable connection structure.

Figure 14:
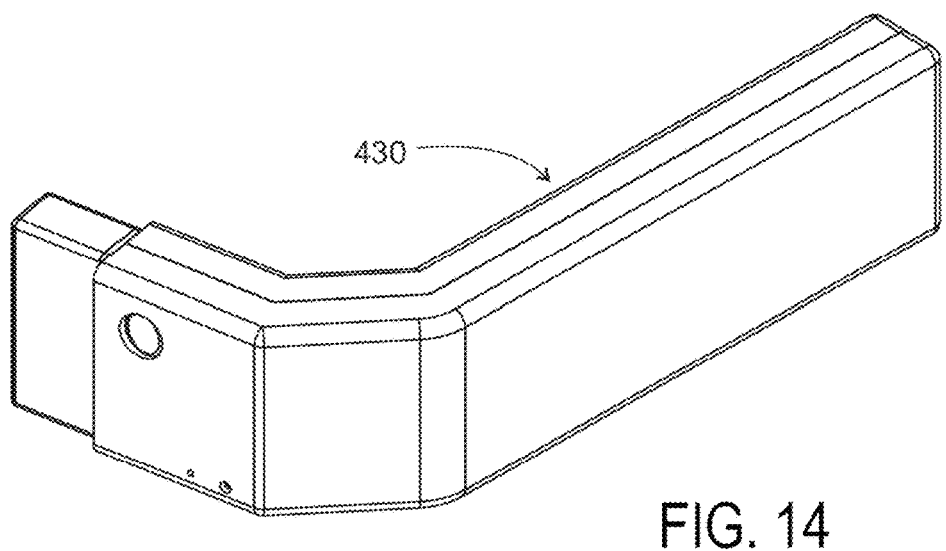
FIG. 14 illustrates the assembled device ready for attachment to the glasses frame.
Figure 15:
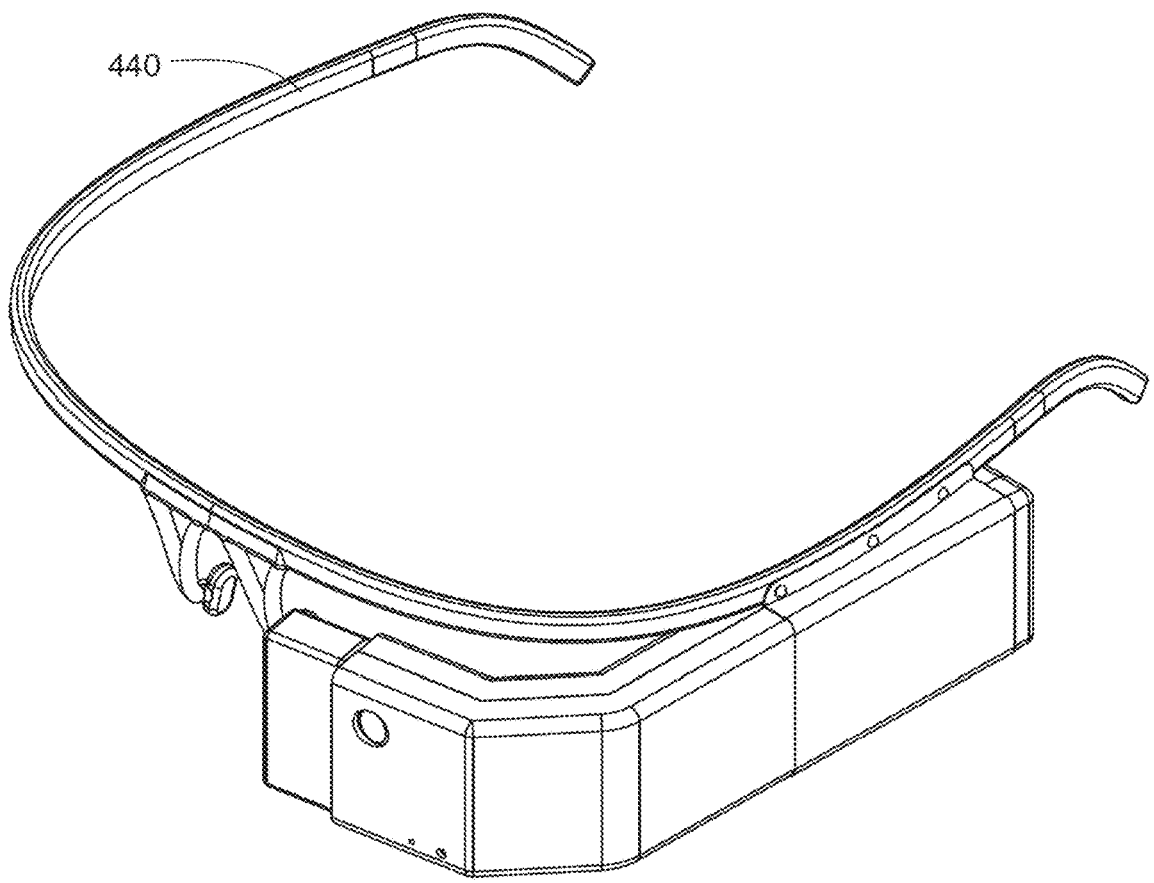
FIG. 15 illustrates the final assembly of the secure testing device onto the glasses frame.

FIG. 14 illustrates the assembled device 430 ready for attachment to a frame of a head-mounted component, usually a glasses frame 440, with the attachment being shown in FIG. 15.

One method of manufacturing and applying the CID 402 has been illustrated in FIGS. 9-12. This invention is not limited to this design. Alternatives include making the CID 402 in the form of a tape and wrapping in around the electronics and making the CID 402 in the form of a bag requiring only sealing at one end. The very thin nature of the CID 402 as disclosed herein permits great freedom of assembly since the edges can be sealed parallel to each other and then tucked out of sight much like wrapping an object with commercially available kitchen grade plastic film, e.g., SARAN WRAP®. It is then easily assembled into a protective housing while covering optical components such as cameras and displays without significantly distorting an image. The thickness of the polyimide film, or other plastic film, can be such as to render the device resistant to accidental destruction of the CID wires. The wires can be positioned on the inside of the film.

The CID 402 has been illustrated herein for use in protecting credit/debit cards, smartphones and a secure testing device. In such applications, it can secure biometric identification data, private encryption keys, proprietary software and other data. Other applications include a digital safe, bitcoin or other cryptographic coin wallets, data containing fobs and other flash memory sticks. It can be used for protecting access to very small devices a few millimeters on a side to very large packages several meters or more on a side. It can even be used in or on walls or other enclosures to detect surreptitious entry to enclosed areas.

For example, as more and more people are ordering products online, the cost of package delivery is under scrutiny and drones, or a combination of drones and driverless delivery trucks, are being tested. The problem is that the packages, in many cases, cannot be delivered to a secure location and may even be deposited in the open, inviting theft. Such packages can be covered with the CID of this invention and attached to a wi-fi or cellphone system communication device and a PIN sent by email to the intended recipient. When the package is received, the intended recipient can enter the code into the communications device on the package prior to opening the package. If the package is opened without entering the PIN, the sending company will be notified and can launch an investigation or immediately notify the local law enforcement authorities as appropriate.

The CID of this invention can be part of a new individual recognition system for buying groceries, entering secure premises, plane boarding, border crossing, voting etc. In this case, as a person approaches a sensing system, it captures an image of the person's face and searches a database to identify and locate an ID number of that person. The ID number can be linked to the public key corresponding to a cellphone or card carried by the person. The sensing system can then send an encrypted number to the person's device which decodes the number and returns the decoded number encoded using the public key of the sensor system. For a person to pass the test, he or she therefore must first have a recognizable face and be carrying the card or phone with the proper private key. Such a card or phone can be protected using the CID of this invention.

For situations where such high certainty is not required, either system can be used independently of the other. For the card only case, the sensor system can send an inquiry and the card return a signal identifying the cardholder. The sensor system can then send the encrypted number and upon return, as above, the transaction can be authorized. To further improve the card or cellphone only case, the card or cellphone can itself have a biometric sensor.

Finally, all patents, patent application publications and non-patent material identified above are incorporated by reference herein. The features disclosed in this material may be used in the invention to the extent possible.

The invention claimed is:

1. An intrusion-protected memory-containing assembly, comprising:
   a substrate;
   at least one data storage component on said substrate;
   a processor on said substrate; and
   a chassis intrusion detector assembly around said substrate, said chassis intrusion detector assembly comprising:
      a first plastic film;
      a mesh comprising conductor wires arranged on said first plastic film, said conductor wires being connected together in a circuit with said processor to form a transmission line, whereby breaking of one of said conductor wires causes variation of current through or impedance of the transmission line; and
      a second plastic film covering said mesh, said second plastic film having at least one sealed edge alongside said substrate and formed by two, previously separated portions of said second plastic film, said at least one sealed edge being integrated with said mesh of said conductor wires such that the two portions of said second plastic film are inseparable from one another without breaking one of said conductor wires of said mesh, said processor being configured to take action to prevent access to data in said at least one data storage component upon detecting a variance in current through or impedance of the transmission line defined by said conductor wires caused by breaking of one of said conductor wires.

2. The assembly of claim 1, further comprising a display arranged on said substrate, said chassis intrusion detector assembly being transparent in a region over an active area of said display.

3. The assembly of claim 1, further comprising an imaging component arranged on said substrate, said chassis intrusion detector assembly being transparent in a region over an active area of said imaging component.

4. The assembly of claim 1, wherein said chassis intrusion detector assembly is transparent.

5. The assembly of claim 1, wherein said processor is configured to render said at least one storage component inoperable upon detecting the variance in current through or impedance of the transmission line defined by said conductor wires caused by breaking of one of said conductor wires and thereby prevent access to data in said at least one storage component.

6. The assembly of claim 1, further comprising an access functionality coupled to said substrate and that enables access to said at least one storage component, said processor being configured to render said access functionality inoperable upon detecting the variance in current through or impedance of the transmission line defined by said conductor wires caused by breaking of one of said conductor wires and thereby prevent access to data in said at least one storage component.

7. The assembly of claim 1, further comprising a power providing system arranged on said substrate to provide power to operate said processor.

8. The assembly of claim 1, wherein said substrate is bendable to form an L-shaped unit.

9. The assembly of claim 1, wherein said conductor wires are formed and situated in a grid pattern throughout said first plastic film.

10. The assembly of claim 1, wherein said first and second plastic films are polyimide films.

11. The assembly of claim 1, wherein said conductor wires are connected together in a single circuit with said processor to form a single transmission line.

12. A method for protecting a data storage component mounted on a substrate from intrusion, the substrate also including an optical component and a processor, the method comprising:
placing a flat assembly around the substrate to form an enclosure with the substrate therein, the flat assembly being transparent in a region over an active area of the optical component and comprising a first plastic film, a mesh comprising conductor wires arranged on the first plastic film, and a second plastic film covering the mesh;
connecting the conductor wires together in a circuit with the processor to form a transmission line with a variation of current through or impedance of the transmission line indicative of breaking of one of the conductor wires being detectable by the processor to enable action to be taken to prevent access to the component; and
sealing at least two spaced apart edges of the second plastic film to each other to form a closed edge alongside the substrate and integrating the sealed two edges with the mesh of conductor wires such that the sealed two edges are inseparable from one another without breaking one of the conductor wires.

13. The method of claim 12, further comprising:
holding edges of the flat assembly together prior to sealing the edges of the second plastic film with an opening in one edge of the flat assembly; and then
evacuating air from the enclosure through the opening and thereafter sealing the edges of the second plastic film.

14. The method of claim 12, wherein the step of sealing edges of the second plastic film comprises heating the flat assembly until an adhesive coating on opposing surfaces of the first plastic film that face one another to define the enclosure fuse together.

15. The method of claim 14, further comprising trimming excess material around the substrate.

16. The method of claim 12, wherein the flat assembly is entirely transparent.

17. The method of claim 12, wherein a USB connector is attached to the substrate, the method further comprising guiding wires connected to the USB connector in a zig-zag or serpentine path underneath the mesh.

18. The method of claim 12, wherein the first and second plastic films are polyimide films.

19. The method of claim 12, wherein the step of connecting the conductor wires together in a circuit with the processor to form a transmission line consists of connecting the conductor wires together in a single circuit with the processor to form a single transmission line.

20. The method of claim 12, further comprising:
determining, using the processor, the current through or impedance of the transmission line after sealing the at least two spaced apart edges of the second plastic film to each other; and
using the determined current or impedance as a baseline when subsequently analyzing current through or impedance of the transmission line in order to detect breaking of one of the conductor wires resulting in variation of the current through or impedance of the transmission line from the baseline.

* * * * *